(No Model.)

A. HOBT.
SWEAT PAD FASTENER.

No. 377,715.                                    Patented Feb. 7, 1888.

WITNESSES:
Fred G. Dieterich
Solon C. Kemon

INVENTOR:
A. Hobt
BY Munn & Co.
ATTORNEYS.

UNITED STATES PATENT OFFICE.

ALBERT HOBT, OF WELLSTON, OHIO, ASSIGNOR TO RODNEY W. GODDARD, TRUSTEE, OF SAME PLACE.

SWEAT-PAD FASTENER.

SPECIFICATION forming part of Letters Patent No. 377,715, dated February 7, 1888.

Application filed September 14, 1887. Serial No. 249,730. (No model.)

*To all whom it may concern:*

Be it known that I, ALBERT HOBT, of Wellston, in the county of Jackson and State of Ohio, have invented a new and useful Improvement in Pad-Fasteners, of which the following is a specification.

My invention relates to means for securing a pad onto a horse-collar.

The object of the invention is to provide a simple and inexpensive device which will hold the collar and pad securely together, and which will snugly fit within the hames-crease of the collar, to be out of the way of the hames.

My invention consists in the combination, with the collar and collar-pad, of a cotter-shaped fastening of malleable metal passed through the pad and through the hames-crease of the collar and folded down at its perforating ends within said crease, as hereinafter particularly described with reference to the accompanying drawings, wherein—

Figure 1:
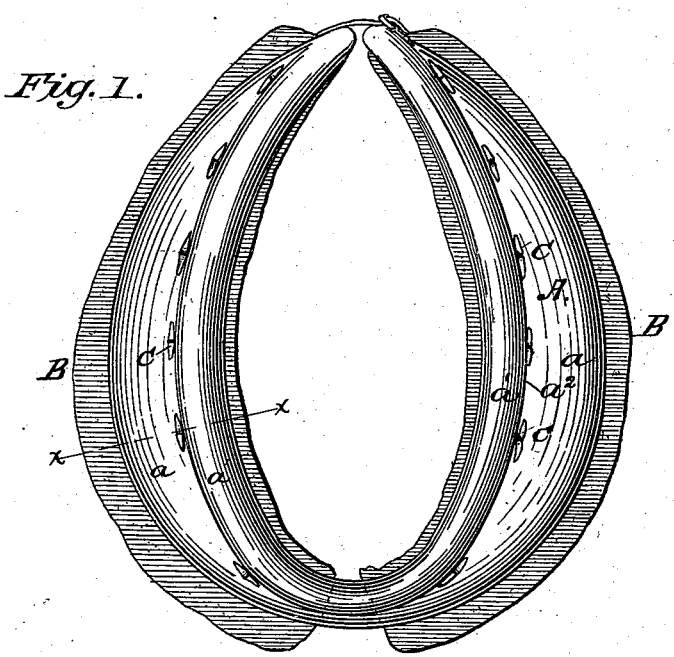
Figure 2:
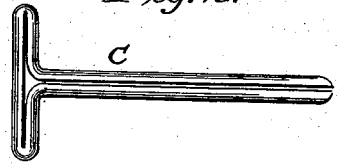
Figure 3:
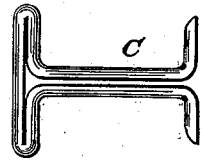
Figure 4:
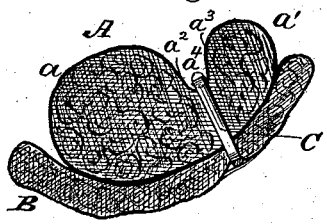

Figure 1 is a perspective of a part of a horse-collar and pad secured together in accordance with my invention; Fig. 2, a side elevation of the fastening in shape for insertion through the collar and pad; Fig. 3, a similar representation of a fastening bent at its perforating ends for securing it in position; and Fig. 4 is a section on line $x\ x$ of Fig. 1.

The collar A is of usual form, having a roll, $a$, to rest against the horse's shoulders, and a roll, $a'$, and crease $a^2$, to retain the hames upon the collar.

The pad B, of any well-known or preferred form, is fitted within the collar to bear against the inner side or bearing-surface thereof, and is securely held therein and prevented from twisting, slipping, or rubbing between the collar and the horse's shoulder by fastenings C, made of malleable metal, preferably of a half-round bar of copper bent into the form of the letter T, having its middle portion formed into a flattened loop, and its perforated ends carried outwardly at right angles from the middle portion of said loop, the flattened portion of the half-round wire being brought together to form a round bar of suitable strength and shaped to closely fit round perforations made in the reduced portion $a^4$ between the hame creases $a^2\ a^3$ of the collar.

The reduced portion $a^4$ of the collar is suitably perforated or punctured, preferably upon both sides and at suitable distances apart, to hold the pad securely and prevent it from slipping or shifting between the collar and the horse's shoulder when the horse is in motion. The pad is stretched tightly upon the inner side of the collar, and is perforated to conform to the perforations in the collar, and the fastenings are then inserted and turned down at their ends, their round sides to closely fit within the outer crease and within one of the correspondingly-reduced or quilted portions of the pad.

A secure connection is effected between the pad and the collar. The said parts may be separated, when desired, by turning up or straightening out the ends of the fastening.

By securing the pads at suitable distances around the collar, as herein described, by such removable fastenings the pad may be tightly stretched to fit the collar, and will be prevented from creeping or shifting when in use, and thus forming folds or ruffles upon the pad, which will rub and seriously injure the horse's shoulders.

I claim as my invention and desire to secure by Letters Patent—

The combination, with a horse-collar having a reduced portion and creases formed opposite said reduced portion, of a pad fitted within the collar and formed with reduced quilted portions, and the folded T-shaped cotter-bar, rounded upon one side and flat upon the other, passed through said reduced portions and folded with the creases of the pad and collar, substantially as described.

ALBERT HOBT.

Witnesses:
D. F. EDWARDS,
L. W. RICHARD.